(12) United States Patent
Nava et al.

(10) Patent No.: US 6,178,023 B1
(45) Date of Patent: Jan. 23, 2001

(54) OPTICAL TELECOMMUNICATION METHOD PROVIDING A TRANSMITTING AND RECEIVING SERVICE CHANNEL

(75) Inventors: Adriano Nava, Milan; Mario Tamburello, Vimercate, both of (IT)

(73) Assignee: Pirelli Cavi S.p.A., Milan (IT)

(*) Notice: Under 35 U.S.C. 154(b), the term of this patent shall be extended for 0 days.

(21) Appl. No.: 09/134,551

(22) Filed: Aug. 14, 1998

Related U.S. Application Data (63) Continuation of application No. 08/619,789, filed on Mar. 20, 1996, now Pat. No. 6,038,047.

(30) Foreign Application Priority Data

Mar. 28, 1995 (IT) .................................. MI95A0615

(51) Int. Cl.$^7$ .................................................. H04B 10/00
(52) U.S. Cl. ...................... 359/158; 359/162; 359/181; 359/191
(58) Field of Search .................... 359/158, 162, 359/191, 181

(56) References Cited

U.S. PATENT DOCUMENTS 6,038,047 * 3/2000 Nava et al. .......................... 359/154

FOREIGN PATENT DOCUMENTS

| | | | |
|---|---|---|---|
| 60-199244 | * | 10/1985 (JP) | 359/182 |
| 59205837 | * | 2/1986 (JP) | 359/182 |
| 61-029246 | * | 2/1986 (JP) | 359/154 |
| 1647904 | | 5/1991 (RU) | |

OTHER PUBLICATIONS

I. I. Teumin (Editor), Optical Telecommunications, Radio and Communications Publishers, Moscow, 1984, pp. 34–35, with English language translation.

Vasiliev, V. I. et al., *Methods and Means for Organization of Data Transmission Channels*, Radio and Communications Publishers, Moscow, 1982, pp. 9–15, with English language translation.

* cited by examiner

Primary Examiner—Leslie Pascal
Assistant Examiner—Hanh Phan
(74) Attorney, Agent, or Firm—Oblon, Spivak, McClelland, Maier & Neustadt, P.C.

(57) ABSTRACT

A digital optical telecommunication method including the steps of: generating a digital modulated optical signal in an optical transmitting station, which signal corresponds to a first electric input signal carrying a piece of information; feeding the modulated optical signal to an optical-fibre line; receiving the modulated optical signal transmitted from the optical-fibre line at an optical receiving station, converting it to an electric form and thereat generating a second digital electric signal; wherein the modulated optical signal is coded in a sequence of elementary information units at a first frequency and wherein the step of generating a second digital electric signal comprises detecting in said converted signal, an electric signal having a second frequency higher than the first frequency and recognizing in said detected signal, the phase of an electric signal at the first frequency by comparing a received sequence of elementary information units with at least one reference sequence and verifying their correspondence to a predetermined condition.

21 Claims, 9 Drawing Sheets

OPTICAL TELECOMMUNICATION METHOD PROVIDING A TRANSMITTING AND RECEIVING SERVICE CHANNEL

This application is a continuation, of application Ser. No. 08/619,789 now U.S. Pat. No. 6,038,047, filed Mar. 20, 1996.

FIELD OF THE INVENTION

The invention relates to an optical telecommunication system. More particularly it refers to a telecommuncation system having an optical-fibre transmitting line in which an independent channel for service communications comprising a data-transmitting unit and a data-receiving unit for transmission/reception over said service channel is provided.

Optical-fibre telecommunication systems adapted to enable signal transmission for communication over long distances usually provide, in addition to channels intended for communication signals and put at the users' disposal, also an independent channel adapted to enable transmission of service signals.

BACKGROUND OF THE INVENTION

Such service signals can be of various types, for example command or control signals for apparatus disposed along the line, such as repeaters or amplifiers, or communication signals between the maintenance staff acting at a line point and an intermediate station or terminal of the line itself.

For service signals a restricted transmission band as compared with the band of the communication channels is usually sufficient. An overall transmission speed of 300 Kbit/s, in the case in which service signals are coded on a single digital channel is deemed sufficient, for example.

In an optical-fibre telecommunication system a remedy for signal attenuation along the fibres is necessarily provided by periodically amplifying the signals. The use of optical amplifiers disposed at regular intervals along the transmission line has proved to be convenient.

Such amplifiers, that can be made of optical fibres doped with a fluorescent substance and submitted to optical pumping, are capable of amplifying the signals without converting them to an electric form.

In these lines it is impossible to insert and extract signals into and from the fibre along which they are transmitted by means of known electronic apparatus, because signals are available in the optical form even close to the amplifiers.

U.S. Pat. No. 5,113,459 in the name of the assingee of this application describes an optical telecommunication system optionally provided with optical amplifiers along the line, in which insertion and extraction of the service channel takes place by dichroic couplers.

Also provided in this system are receiving and emitting units connected to the dichroic couplers, adapted to receive optical service signals from the line, convert them to electric signals and electronically amplify them, and to receive the amplified electric signals, convert them to optical signals at the wavelength of the service channel and send them to the line, respectively.

In order to carry out separation between the signals by means of dichroic couplers, the wavelength of the service channel has been selected considerably different from that of the communication channels. In addition, for minimizing attenuation for the service channel, this wavelength has been selected substantially coincident with or to a small distance from a minimum of the spectral attenuation curve of light in the optical fibre.

In the case in which the telecommunication signal wavelength is substantially included between 1500 and 1600 nm (the so-called "third window" for silica-based optical fibres) and the service channel wavelength is included in the so-called "second window", for silica-based optical fibres located in the vicinity of the relative attenuation minimum at about 1300 nm, the attenuation to which the service signals are submitted is much greater than that relating to the communication channels.

In fact, at the second window wavelengths, the attenuation coefficient for silica-glass optical fibres usually in use has a value typically included between 0.37 and 0.41 dB/km, against a typical value of about 0.2 dB/km for wavelengths within the third window.

The length of the line portion included between two amplifiers or between one of the end stations and one of the amplifiers is given by the maximum acceptable attenuation at the wavelengths of the communication channels, in turn linked to the maximum available gain at those wavelengths.

With the optical amplifiers presently in use this maximum gain is about 25–30 dB.

The overall attenuation value at the wavelength of the service channel along the portion between two amplifiers may therefore reach values higher than 50 dB, for example.

In order to generate the radiation to be used for transmission of the service channel, the use of semiconductor lasers is provided. Semiconductor lasers with emission at the wavelength of the second window have a typical output power of about 1 mW (0 dBm). Lasers having a greater output power are undesirable due to their high costs.

Taking into account the reduction of the laser output power in time and aging of the passive optical components along the transmission line, a further power reduction at the receiver of about 8 dB can be expected.

The problem exists therefore of transmitting digital signals, in particular service signals, along an optical communication line and receiving them with a sufficiently low error rate, in the presence of a limited power at the receiver.

SUMMARY OF THE INVENTION

The present invention in one aspect consists of a digital optical telecommunication method comprising the steps of:
receiving a first electric signal carrying a piece of information at an optical transmission station and generating a digital modulated optical signal at a predetermined wavelength, corresponding to said electric signal;
feeding said modulated optical signal to an optical-fibre line having a predetermined unitary-attenuation value at said wavelength;
receiving said modulated optical signal transmitted from said optical-fibre line to a given optical-power level, at an optical receiving station, converting it to an electric form and thereat generating a second digital electric signal;
characterized in that:
said step of generating a modulated optical signal comprises coding said piece of information of said first electric signal in a sequence of elementary information units univocally associated with said piece of information, said units following one after the other according to a first predetermined cyclic time rate, and
said step of generating a second digital electric signal comprising detecting in said converted signal, an electric signal having a second cyclic time rate higher than said first cyclic time rate and recognizing in the detected signal, the phase of an electric signal at said first time rate by comparing a received sequence of elementary information units with at least one reference sequence and verifying the correspondence of result in said comparison at a given condition.

Preferably said second time rate is a multiple of said first time rate.

In a preferential version, said step of generating a modulated optical signal comprises generating a third digital electric signal having said second time rate, starting from said sequence of elementary information units following one after the other according to a predetermined first time rate. Said modulated optical signal can be generated to advantage by modulating the emission of a coherent-radiation source, by means of said third digital electric signal. Advantageously, said third digital electric signal can be generated by phase-modulating a carrier having said second time rate.

Preferably said step of converting said received optical signal to an electric form comprises detecting said received optical signal, converting it to an electric signal, filtering said electric signal and amplifying said filtered signal.

Preferably said reference sequence has said first time rate.

In a particular embodiment, said step of recognizing in the detected signal, the phase of an electric signal at said first time rate comprises:

generating a timing signal at said first time rate and with a random phase;

determining, within each period of said timing signal at said first time rate, the leading edges of said electric signal with said second time rate that are not simultaneous with the leading edge of the timing signal;

counting the leading edges determined in the first and second halves of said period, using opposite signs respectively;

adding up the results of the above counting over several consecutive periods;

comparing said sum with at least one predetermined value;

adjusting the phase of said timing signal to said first time rate on exceeding of said value.

Preferably, said step of generating a second electric signal comprises recognizing, during each period of said first time rate, an information unit in a sequence of elementary information units of the detected electric signal.

In a particular embodiment, said step of receiving said first electric signal comprises receiving a predetermined number of tributary digital electric signals with a third time rate lower than said first time rate and multiplexing them to form a digital electric signal at said first time rate.

Advantageously, said particular embodiment comprises the steps of extracting timing signals at said third time rate from said second digital electric signal and reconstructing digital electric signals of same number as said tributary electric signals, starting from said second digital electric signal and based on said timing signals at said third time rate.

In a particular embodiment said predetermined wavelength is included between 1200 nm and 1400 nm.

In a particular solution, said predetermined unitary-attenuation value is included between 0.37 dB/km and 0.41 dB/km.

The present invention in a second aspect consists of a digital optical telecommunication method comprising the following steps:

coding in a differential form, one digital electric signal at a first time rate from an input port;

modulating, by said coded signal, the phase of a carrier at a second time rate which is a multiple of the first time rate;

modulating by said carrier, the emission of a laser at a predetermined wavelength;

feeding the signal emitted from the laser to one end of an optical-fibre line;

receiving said optical signal at the other end of said optical-fibre line;

detecting said optical signal by converting it to an electric signal;

amplifying said electric signal;

filtering said amplified electric signal so as to remove the spectral components external of a band centered on said second time rate;

converting said filtered signal to a digital form;

generating a timing signal at said second time rate, in timed relation with said digitalized signal;

sampling said signal in a digital form based on said timing signal at said second time rate;

operating a differential demodulation of said sampled signal;

generating a reconstructed digital signal at said first time rate;

feeding said reconstructed digital signal to an output port; characterized in that said operation of generating a reconstructed digital signal at said first time rate comprises the following steps:

generating a timing signal at said first time rate and with a random phase;

determining, within each period of said timing signal at said first time rate, the leading edges of said demodulated signal that are not simultaneous with a leading edge of said timing signal;

counting the leading edges determined in the first and second halves of said period, using opposite signs respectively;

adding up the results of the above counting over several consecutive periods;

comparing said sum with at least one predetermined value;

adjusting the phase of said timing signal to said first time rate on exceeding of said value.

The present invention in a third aspect consists of an optical telecommunication system comprising:

an optical transmitting station, adapted to receive a first electric signal at a first frequency and generate a modulated optical signal corresponding to said first electric signal, said optical signal having a predetermined wavelength;

an optical receiving station, adapted to receive said modulated optical signal and thereat generate a second electric signal at said first frequency, comprising means for converting said optical signal to an electric form;

an optical-fibre line joining said transmitting station and said receiving station, by transmission of said optical signal; characterized in that:

said transmitting station comprises modulation means for said first electric signal at a second frequency greater than said first frequency, said receiving station comprises:

a detection circuit comprising an optical detector of predetermined sensitivity, adapted to generate a third electric signal at said optical signal;

a demodulation circuit, comprising:

a recognition circuit for recognizing the phase of said third electric signal, and a decision circuit, controlled by said recognition circuit, adapted to generate said second electric signal at said first frequency, wherein the Bit Error Rate (BER) is better than $10^{-5}$, the power of the optical signal entering said receiving station being lower than a predetermined optical power smaller than said predetermined sensitivity.

In a particular embodiment said predetermined wavelength is included between 1200 and 1400 nm.

In a preferential solution said predetermined optical power is at least 6 dBm lower than said predetermined sensitivity.

In a preferential embodiment, said first frequency is not less than 200 KHz.

Preferably said second frequency is a multiple of said first frequency.

The present invention in a fourth aspect consists of an optical telecommunication system comprising at least one telecommunication signal-emitting station and one telecommunication signal-receiving station, one optical-fibre line joining said transmitting and receiving stations and at least one optical amplifier, means for admitting optical service signals and means for extracting optical service signals to and from the optical fibre of the line respectively, which means comprises at least one emitting and/or receiving unit for optical service signals, which unit is adapted to receive from the optical line and/or emit towards the same, service signals consisting of communication or control signals electrically supplied to or extracted from the unit itself, in the form of optical signals having a service wavelength remarkably different from the wavelength of the telecommunication signals, which unit is associated with a related optical coupler connected along the line, adapted to couple the optical service signals at the inside of the line fibre and/or extract said signals from the latter, at least one means for admitting or extracting optical service signals being associated with at least one optical amplifier, characterized in that this optical-signal emitting and/or receiving unit comprises:

an optical emitting station, adapted to receive said communication or control signals, generate a modulated optical signal including said communication or control signals and having said service wavelength, and send said optical signal into a respective associated optical coupler;

an optical receiving station, adapted to receive an optical signal at said service wavelength from a respective associated optical coupler and thereat generate said electric communication or control signals, which station comprises means for converting said received optical signal to an electric form;

wherein said optical emitting station comprises:

means for generating a first electric signal at a first frequency, including said communication or control signals, and wherein said optical receiving station comprises:

a detection circuit comprising an optical detector adapted to generate a second electric signal at said received optical signal;

a demodulation circuit, comprising:
- a recognition circuit for recognizing a phase in said second electric signal;
- a decision circuit, controlled by said recognition circuit, adapted to generate a third electric signal at said first frequency, comprising said communication or control signals supplied to the emitting and/or receiving unit;
- a separation circuit, adapted to generate said electric communication or control signals supplied to the emitting and/or receiving unit, starting from said third electric signal.

BRIEF DESCRIPTION OF THE DRAWINGS

More details will be apparent from the following description, with reference to the accompanying drawings, in which.

Figure 1:
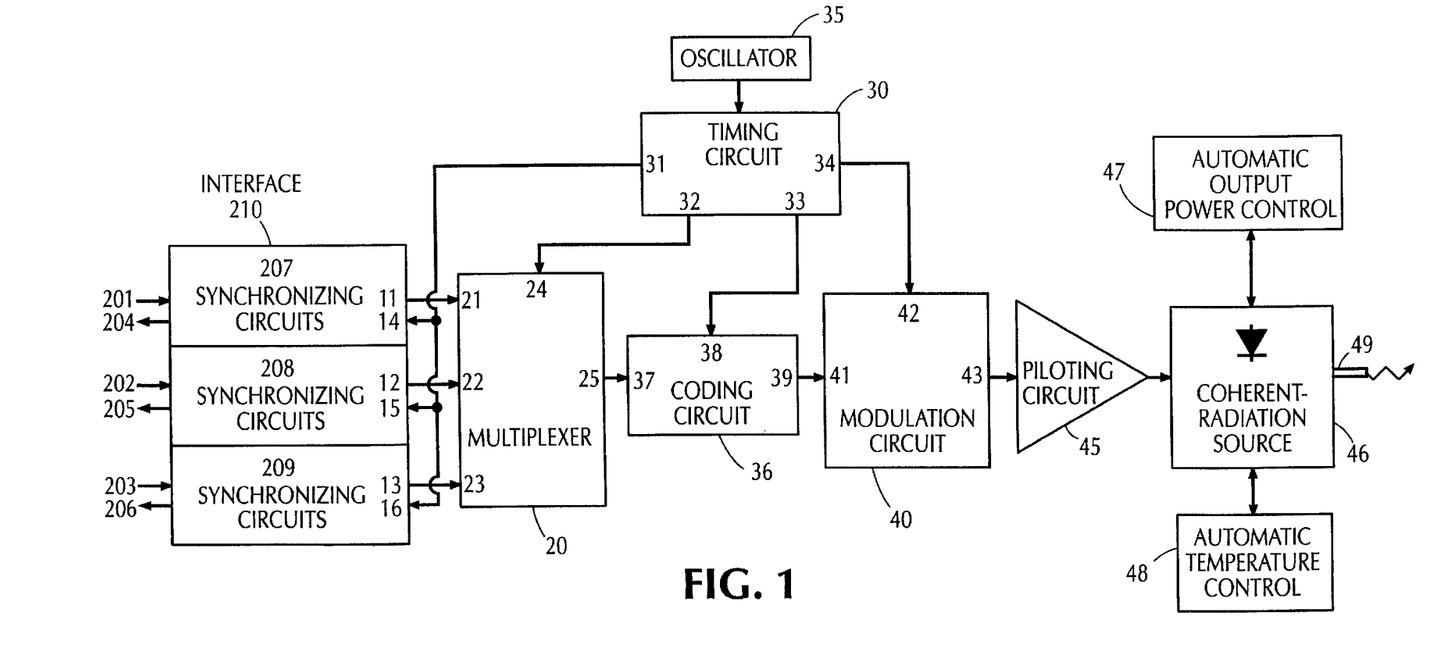
FIG. 1 is a diagram showing an optical transmitting unit according to the invention.

An optical digital-signal-transmitting unit according to the present invention will be now described with reference to FIG. 1.

In a block diagram, an input interface for a given number of electric signals in a digital form, all of same frequency $f_1$ has been identified by reference numeral 210. In the figure three digital signals 201 202, 203 referred to as tributary signals, are shown at the input of the synchronizing circuits 207, 209, 208 forming the interface 210 respectively, and in the following of the description reference will be made to the case in which three tributary signals are transmitted. The device however can be intended for any other number of independent tributary signals, a person skilled in the art being capable of executing the necessary adaptations.

The voltage values corresponding to condition "0" and condition "1" are the same for all tributary signals and preferably are values dictated by one of the known standards.

The synchronizing circuits 207, 208, 209 perform the function of synchronizing the tributary signals. The outputs 11, 12, 13 each reproduce the respective input signal which is such delayed that the leading edge is in alignment with a common timing signal, consisting of a square wave at an input frequency $f_1$ at the respective terminals 14, 15, 16, and coming from a timing circuit 30.

The timing signal at frequency $f_1$ is also sent (204, 205, 206) to the unit generating the tributary digital signals 201, 202, 203 so as to synchronize these units at a common frequency.

As the synchronizing circuits 207, 208, 209, devices available on the market may be used, such as for example interfaces following CCITT standard, named V11, or EIA standard, named RS 422, in the version providing counter-directional timing to signals.

The synchronized digital signals from the input interface 210 are sent to the input ports 21, 22, 23 of a multiplexer 20.

By multiplexer it is intended a digital circuit capable of accepting a certain number of digital input signals and combining them to form a single signal to be identified as aggregate signal, of frequency $f_2$, which is a multiple of $f_1$, containing all information relating to the input signals in addition to synchronism information sufficient to enable signals to be separated again from each other.

Multiplexer 20 used in the device of the present invention is such made as to combine the input signals from terminals 21, 22, 23 according to a fixed temporal configuration, referred to as frame, to form an aggregate signal at a frequency $f_2$, which is the frequency of a synchronizing signal consisting of an input square wave to terminal 24 coming from terminal 32 of the timing circuit 30.

Frequency $f_2$ is selected such as to verify the relation:

$$f_2=(n+m)\cdot f_0,$$

wherein n is the number of input signals to multiplexer 20, corresponding to the number of tributary signals, and m is an integer greater than zero, linked to the density of synchronism present in the frame with respect to the combined signals.

The multiplexer temporally divides each of the n input signals into n words of a given number p of bits and copies each bit of each word at a given position of a word of p·(n+m) bits, called aggregate word. In the aggregate word m words of p synchronism bits are inserted, which are necessary to reconstruct the position of the bits corresponding to the different tributary signals, during the receiving step. The aggregate word is then serially transmitted at a frequency $f_2$ to the output terminal 25 of the multiplexer. This process of multiplexing the words of the input signals into aggregate words is repeated cyclically, so as to achieve an aggregate digital signal of frequency $f_2$ from terminal 25. The time necessary to the transmission of one bit of the aggregate digital signal, that is the reversal of frequency $f_2$, is referred for as symbol interval.

In a device made by the Applicant n=3 tributary channels were combined and a value m=1 was selected. Then $f_2$=4·f was selected. The number of bits of each word was fixed to p=8.

Figure 2:
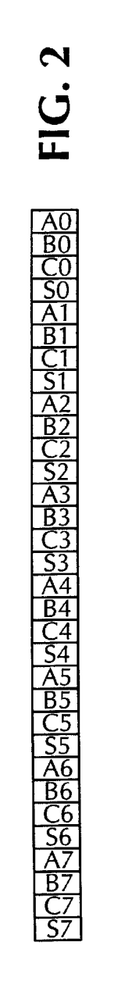
FIG. 2 is a diagram of a frame used in the device of the invention.

The frame used in the device, such determined as to simplify the subsequent decoding process, is shown in FIG. 2.

In said frame, the corresponding bits of words of the three input signals were denoted by A0 ... A7, B0 ... B7, C0 ... C7 and the bits of the synchronism word by S0 ... S7.

Said frame can be easily extended to the case of a number of signals to be combined different from three.

The aggregate output signal from terminal 25 of multiplexer 20 is sent to a terminal 37 of a differential coding circuit 36 also receiving a synchronizing input signal at a frequency $f_2$, from terminal 33 of the timing circuit 30.

The differential coding circuit 36, starting from the aggregate signal generates a coded digital signal of same frequency which changes its logic level (that is involves a bit of logic level opposite to the preceding bit) for each bit at a logic level "1" of the aggregate signal and stays at the same logic level (that is involves a bit of same value as the preceding bit) for each "0" of the aggregate signal. This coded digital signal comes out of terminal 39 of circuit 36.

The differential coding circuit 36 can be made by a T-type flip-flop.

The timing circuit 30 also generates, in addition to the already mentioned timing signals, a timing signal consisting of a square wave at a frequency $$f_3=q\cdot f_2,$$

wherein q is an integer greater than or equal to 2. Preferably q≧4. In a device made by the Applicant q was selected equal to 16. This signal is made available at terminal 34.

All timing signals are generated in the timing circuit 30 starting from a signal at a frequency $2\cdot f_3$ generated by an oscillator 35.

A modulation circuit 40, made following known techniques, receives at the input port 41, the coded signal from terminal 39 of the coding circuit 36 and therewith modulates the phase of the timing signal at frequency $f_3$, entering the input port 42. The phase-modulated signal is emitted from terminal 43 of the modulation circuit 40.

The ratio value q between frequencies $f_3$ and $f_2$ establishes the redundancy degree introduced into the signal by the modulation.

The phase-modulated signal corresponds to a succession of square wave portions at frequency $f_3$, each comprising q periods of the square wave, the phase of each portion varying at each bit "1" of the aggregate signal and staying unchanged at each "0" of the aggregate signal.

This modulation technique, currently referred to as DPSK (Differential Phase Shift Keying), is conventionally used for transmission of digital signals through modems operating on telephone lines of the traditional type or for transmission via satellites.

The multiplexer 20, differential coding circuit 36 and modulation circuit 40 can consist of a single programmable logic component, model XC3030 for example, produced by XILINX Inc., 2100 Logic Drive, San Jose, Calif. (US).

The phase-modulated signal is used for modulating the emission intensity of a coherent-radiation source 46, a semiconductor laser for example, through a piloting circuit 45 made following a known technique, which generates the necessary current levels to bring the laser to an emission condition or under-threshold condition at logic levels "1" or "0" of the phase-modulated signal.

The radiation emitted from the laser is coupled with an optical fibre 49.

The coherent-radiation source 46 may consist of a semiconductor laser having an emission in the band at about 1300 nm, of GaInAsP for example, such as model QLM-3S-86 1-002, produced by LASERTRON Inc., 37 North Avenue, Burlington, Mass. (US).

This model comprising a Peltier cell for cooling the laser, a thermistor for temperature measurement and a photodiode for monitoring the output power, is characterized by an emission wavelength included between 1290 and 1330 nm and a maximum output power of 2.5 nW.

The optical transmission unit also comprises a circuit 47 for automatic control of the output power of laser 46 and a device 48 for automatic control of the temperature thereof, which circuit and device can optionally make use of power or temperature sensors integrated into the laser container, as in the case of the cited model.

In a device made by the Applicant, the power control circuit 47 has been set so that the optical power sent along an optical fibre line connected to the laser by fibre 49 and a fused-fibre dichroic couper is about 0 dBm. The laser temperature has been kept at about 25° C. by means of circuit 48.

An optical unit for reception of digital signals according to the present invention, adapted to receive and decode the signals transmitted by the disclosed transmitting unit will be now described with reference to FIGS. 3 and 4.

Figure 3:
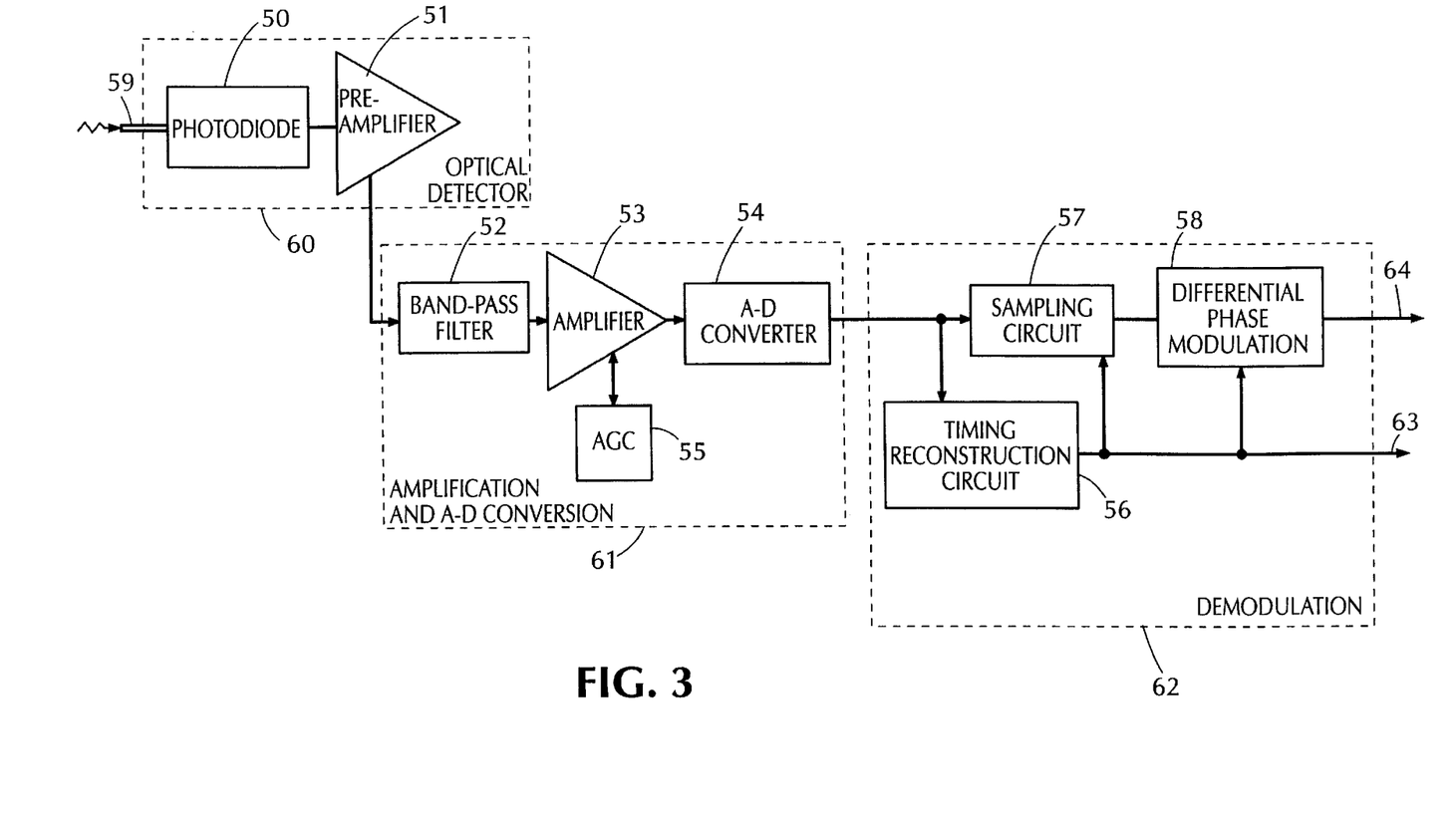
FIG. 3 is a diagram of the first section of the optical receiving unit according to the invention.

In particular, shown in FIG. 3 is the first section of the optical receiving unit comprising parts for detection of the optical signal, amplification and demodulation of same.

In a block diagram, an optical detector identified by reference numeral 60 consists of a photodiode 50 and a pre-amplifier 51, preferably integrated with the photodiode, adapted to detect an optical signal at a given wavelength, at the input of an optical fibre 59 coupled with the photodiode, and convert it to an electric signal, carrying out a first amplification of said electric signal.

The photodiode 50 and pre-amplifier 51 can consist of a PIN-FET detector with FET of GaAs, model QDFB010-001 for example, available from the already mentioned LASER-TRON. This detector is comprised of a PIN-type photodiode integrated on a common substrate with a FET of GaAs used as the pre-amplifier.

Its nominal sensitivity can reach −50 dBm, although worse values are not excluded in commercially available products. The nominal sensitivity is calculated as the optical input power necessary to keep the BER lower than $10^{-9}$ in case of a transmission in a baseband, wherein by error rate or BER it is intended the probability to receive an erroneous bit during communication.

The Applicant has noted that it is possible to use a PIN-FET detector in the device, with FET of GaAs (the reception noise being in inverse ratio to the frequency and therefore high at low frequencies), in place for example of a detector with FET of silica (the lower noise of which is known, although it is of difficult availability on the market), by virtue of the employed modulation technique moving transmission from the low-frequency band of the aggregate digital signal to the carrier band approximately centered at frequency $f_3$, and by virtue of the introduced redundancy by selecting a frequency $f_3$ which is a multiple of frequency $f_2$. In the carrier band the detector noise is sufficiently reduced to enable detection, with a reduced BER, of optical signals having a power lower than the nominal sensitivity of the detector. Due to redundancy, the aggregate digital signal can be reconstructed at a frequency $f_2$ even in the presence of residual noise for the digital signal at a frequency $f_3$, and therefore a reception with a sufficiently reduced BER can be achieved even in the presence of an optical power at a reception lower than the detector sensitivity.

In case of use of detectors of best sensitivity, therefore, the invention enables the use of transmission lines having a greater attenuation (longer lines for example, or lines of different transmission wavelength) or laser sources of lower power.

Block 61 in FIG. 3 represents an amplification and conversion-to-digital-form stage. It comprises a band-pass filter, a high-gain amplifier, a threshold circuit and an automatic gain control circuit.

Denoted by 52 is a band-pass filter adapted to remove the noise at frequencies different from the carrier modulation band, with a passband centered at frequency $f_3$ of the transmission unit and wider than the carrier modulation band imparted in the transmission unit.

The passband width of filter 52 can be selected in the order of $4 \cdot f_2$.

A high-gain amplifier 53, associated with an automatic gain-control circuit 55 therefore amplifies the filtered signal at a sufficient voltage level for conversion to digital form. A threshold circuit 54 operates this conversion, generating a logic level "1" each time the amplified signal exceeds a predetermined threshold and a level "0" under said threshold.

The band-pass filter 52, high-gain amplifier 53, threshold circuit 54 and automatic gain-control circuit 55 are of the conventional type and can be made following known circuit techniques, in particular by application of the necessary measures to avoid in the circuits, coupling of electric noise from the surrounding environment and other circuits located in the neighbourhood, in particular the circuits of the transmission unit in the case in which a transmitting unit and a receiving unit are made on a single printed circuit to form a line terminal, as explained in the following.

The requested gain for amplifier 53 is linked to the gain of the optical detector employed. In case of use of the detector of the cited model, the overall gain of pre-amplifier 51, filter 52 and amplifier 53 must be close to or higher than 100 dB. The signal amplified and put to digital form is then sent to the demodulation stage, identified by 62 in the block diagram of FIG. 3.

This stage comprises a timing-reconstruction circuit, a synchronizing circuit and a circuit for differential phase demodulation.

The timing-reconstruction circuit 56 generates a timing signal 63 consisting of a square wave at frequency $2 \cdot f_3$, the phase of which is periodically locked to the digital signal phase from the amplification stage 61.

As the timing-reconstruction circuit 56, a phase locked loop (known as PLL) can be used.

The digital signal from the amplification stage is sampled in a synchronous manner with this timing signal 63, by a sampling circuit 57.

The sampling circuit 57 can be made by a flip-flop of type D.

Denoted by 58 is a circuit for a differential phase demodulation receiving at the input, the sampled signal in a digital form from the sampling circuit 57, and the timing signal 63 at frequency $2 \cdot f_3$ from the timing-reconstruction circuit 56. Circuit 58 serially processes the sampled-signal bits, comparing them with a version of same delayed by a symbol interval (that is $2 \cdot q$ bit) and providing a logic signal "1" at the output in case of bit variation, and a logic signal "0" in case of bit permanency. The output signal from circuit a 58 for differential phase demodulation is indicated as digital signal received 64.

Circuit 58 can be made by a shift register controlled by the timing signal 63, acting as a delay line, a gate of XOR function. The shift register contains $2 \cdot q$ bits, that is the number of bits corresponding to a symbol interval of the aggregate digital signal. The sampled signal in a digital form from the sampling circuit 57 is simultaneously sent to the shift register input port and to one of the input ports of a gate XOR. The gate carries out comparison of the signal with the version of same signal delayed by a symbol interval and coming from the output of the shift register. In case of difference between the two inputs of gate XOR, that is in case of variation of one of the bits of the synchronized digital signal with respect to the preceding bit by a symbol interval, there is a logic signal "1" at the gate output, whereas there is a logic signal "0" in case of likeness between the signals entering the gate, that is in case of permanency in the logic value of bits located at a symbol-interval distance.

The gate XOR therefore causes one "1" to correspond to each variation and one "0" to correspond to each permanency, according to the reciprocal diagram of the diagram used for differential coding in the transmitting unit.

By utilizing the differential coding/decoding technique of the aggregate digital signal in the transmitting/receiving unit, the receiver structure is greatly simplified as compared with the traditional art in which reconstruction or the absolute phase of the signal is provided and the presence of local oscillators having a very stable phase is required.

Figure 4:
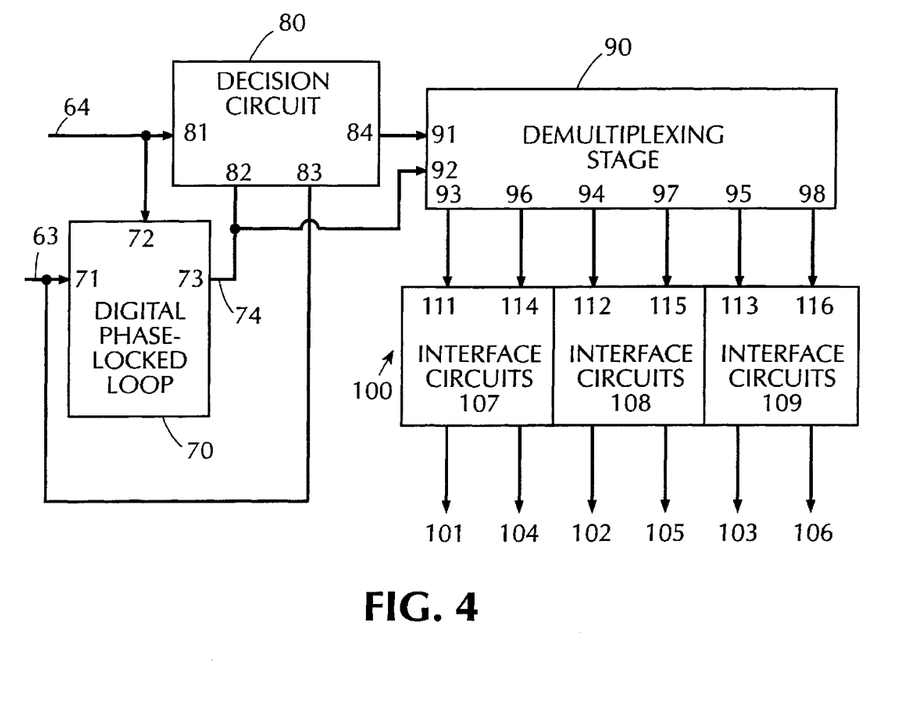
FIG. 4 is a diagram of the second section of the optical receiving unit according to the invention.

Shown in FIG. 4 is a block diagram representing the second section of the optical receiving unit according to the present invention. This section is comprised of a digital phase-locked loop, a decision loop, a demultiplexing stage of the tributary signals and an output unit.

If no noise should be present during transmission, the received digital signal 64 at the output port of the first section of the receiving unit should be a signal of frequency $f_2$ reproducing the aggregate digital signal present in the transmitting unit.

At the input port of the receiver there is, instead, a high noise, due in particular to the high attenuation of the optical signals along the optical fibre line employed for transmission, which reduces the optical signal power at the detector input to a lower level than the nominal sensitivity of said detector.

Due to noise, the received signal 64 has a spurious signal at frequency $f_3$ overlapped with the aggregate signal at frequency $f_2$.

Since during the transmission phase the aggregate signal has been made redundant by modulation at a frequency multiple by a factor q, that is using q bits for transmission of a bit of the aggregate signal, the Applicant has noted that it is possible to reconstruct the aggregate digital signal if the received digital signal 64 is processed so as to find the digital signal at frequency $f_2$ having the maximum overlapping with the received signal.

In particular, it has been noted that this processing can be made in two phases:
reconstruction of the timing signal at frequency $f_2$ showing the maximum overlapping with the received digital signal;
based on the logic values of the 2·q bits of the received digital signal 64 during a reconstructed symbol interval (that is during a period of the reconstructed timing signal at frequency $f_2$), determination of the logic value present the greatest number of times during that interval.

The logic value thus reconstructed corresponds to the most likely logic value of the aggregate digital signal during that interval.

The process comprising these two steps can be carried out directly in a sequential electronic circuit.

Phase-reconstruction of the timing signal at frequency $f_2$ having the maximum overlapping with the received digital signal is obtained by a digital phase-locked loop 70 receiving the timing signal 63 at a frequency $2 \cdot f_3$ at the input port 71 and the received digital signal 64 at the input port 72, and generating the timing signal 74 at frequency $f_2$, made available at the output port 73.

Figure 5:
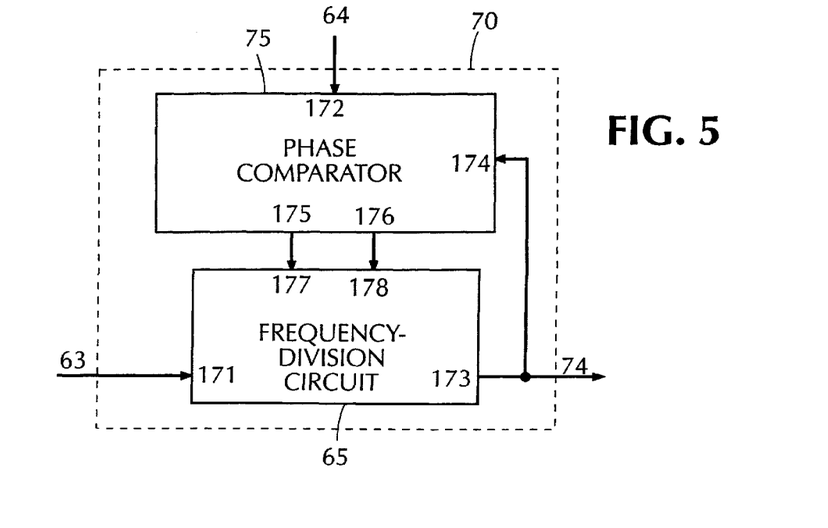
FIG. 5 is a diagram of a phase-locked loop used in the device of FIG. 4.

The phase-locked loop 70 can be made, according to the diagram of FIG. 5, by a frequency-division circuit 65 and a phase-comparison circuit 75.

The frequency-division circuit 65 receives the timing signal 63 at a frequency 2·f at the input port 171, carries out a frequency 3 division according to a factor 2·q and sends a timing signal 74 at frequency $f_2$ to the output 173. The timing signal 74 transmitted to the input port 174 of the phase comparator 75, is compared in circuit 75 with the received digital signal 64. If the phases of the two signals do not show the greatest overlapping, the circuit 75 emits from output 175 or 176, a signal towards the input 177 or 178 of the divider 65, in order to delay or advance the phase of the timing signal 74, respectively.

The phase-comparator circuit 75 comprises a counter of the up/down type. The counter receives counting pulses from the leading edges of the received digital signal 64. If the timing signal 74 at frequency $f_2$, at the terminal input 174 shows a logic level "1", the counter increases by one unit the counted total amount at each leading edge of the received signal 64; reciprocally, if the timing signal at frequency $f_2$ inputted to the terminal 174 shows a logic level "0", the counter decreases by one unit the counted total amount at each leading edge of the received signal 64.

Counting of the up/down counter is disabled when the leading edge of the received signal 64 is at the leading edge of the timing signal 74.

In this manner it is counted the number of times in which, during each half cycle of the square wave 74, there are bits of the digital signal 64 of a logic level different from that of the square wave 74 and the difference between the two sums is made. Statistically the two sums are expected to be the same, because the erroneous bits must be distributed evenly in time. The counted sum therefore does not greatly diverge from zero, even in the presence of erroneous bits, in the case of a "locked" phase, and the threshold of ±q is not exceeded. If the phase of the timing signal 74 is different from that assigned to the received signal 64, on the contrary, the leading edge of the received signal 64 is not excluded from counting, as it is no longer at the leading edge of the timing signal 74; the up/down counter counts the leading edge of the received signal 64 among the erroneous bits and, after a certain number of periods of the timing signal 74, the threshold of ±q is exceeded in one of the two counting directions and a threshold-exceeding signal is generated.

Simultaneously the up/down counter is set to zero.

If exceeding of the threshold takes place in the negative-counting direction, a signal is sent from the output port 175 of circuit 75 to the input port 177 of circuit 65, which signal disables counting of the divider circuit 65 for a period of the timing signal 63 and therefore delays the phase of the timing signal 75 by the same period.

If exceeding of the threshold takes place in the positive-counting direction, a signal is sent from the output port 176 of circuit 75 to the input port 178 of circuit 65, which signal activates a two-unit counting by the divider circuit 65 during a single period of the timing signal 63 and therefore advances the phase of the timing signal 74 by the same period.

After a certain number of initial cycles therefore, the timing signal As 74 locks the phase of the received digital signal 64, even if the latter suffers from noise.

Determination of the logic value which is present the greatest number of times within each reconstructed-symbol interval is made by a decision circuit, denoted by 80 in the diagram of FIG. 4. This circuit receives the received digital signal 64 at the input port 81, the timing signal 74 at frequency $f_2$ at the input port 82, the timing signal 63 at frequency $2 \cdot f_3$ at the input port 83 and emits the reconstructed aggregate digital signal at the output port 84.

Circuit 80 can consist of a counter which is set to zero at the beginning of each symbol interval, that is at each leading edge of the timing signal 74. This counter counts bit occurrences at a logic level "1" in the received digital signal 64 at each period of the timing signal 63. If counting exceeds the q value corresponding to half the periods of the timing signal 63 during a given symbol interval, the logic value of the reconstructed aggregate signal emitted from the output port 84 is put to "1" for that symbol interval. If the threshold of q countings is not exceeded, a logic value of "0" is assigned to the reconstructed aggregate signal for that symbol interval.

The reconstructed aggregate signal according to this technique is the signal which is most likely to reproduce the aggregate digital signal present in the transmitting unit.

The demultiplexing stage of the tributary signals 90, accomplished by known techniques, divides the reconstructed aggregate signal entering terminal 91 into n tributary signals. This stage involves: a frame-synchronization circuit capable of finding the synchronization word within the data flow of the reconstructed aggregate signal; a reconstruction circuit for reconstruction of the timing signals at frequency $f_1$ relating to each of the tributary channels starting from the timing signal 74 entering the terminal 92, by division of signal 74 and alignment based on the frame structure; and a demultiplexer capable of recognizing, within the frame structure, the bits corresponding to the various tributary channels and separating them towards the output ports.

The frame synchronizing circuit can be made by a finite-state machine.

The timing-signal reconstruction circuit can be formed of an n-divider controlled by the frame synchronization circuit.

The demultiplexer can be made of a programmable logic component, model XC3030 for example, available from the already mentioned XILINX. The outputs from the tributary digital signals (93, 94, 95 in the figure referring to the case of n=3 tributary signals) and the respective timing signals at frequency $f_1$ (96, 97, 98) are sent to the input ports 111, 112, 113 and 114, 115, 116 respectively of an interface 100 made up of circuits 107. 108, 109.

As the circuits 107, 108, 109, devices available on the market may be used, such as for example interfaces constructed following the already mentioned standards V11 or RS 422, in the version providing a co-directional timer to the signals.

The outputs from the interface 100 contain the tributary signals 101, 102, 103 and related timing signals 104, 105, 106.

Figure 6:
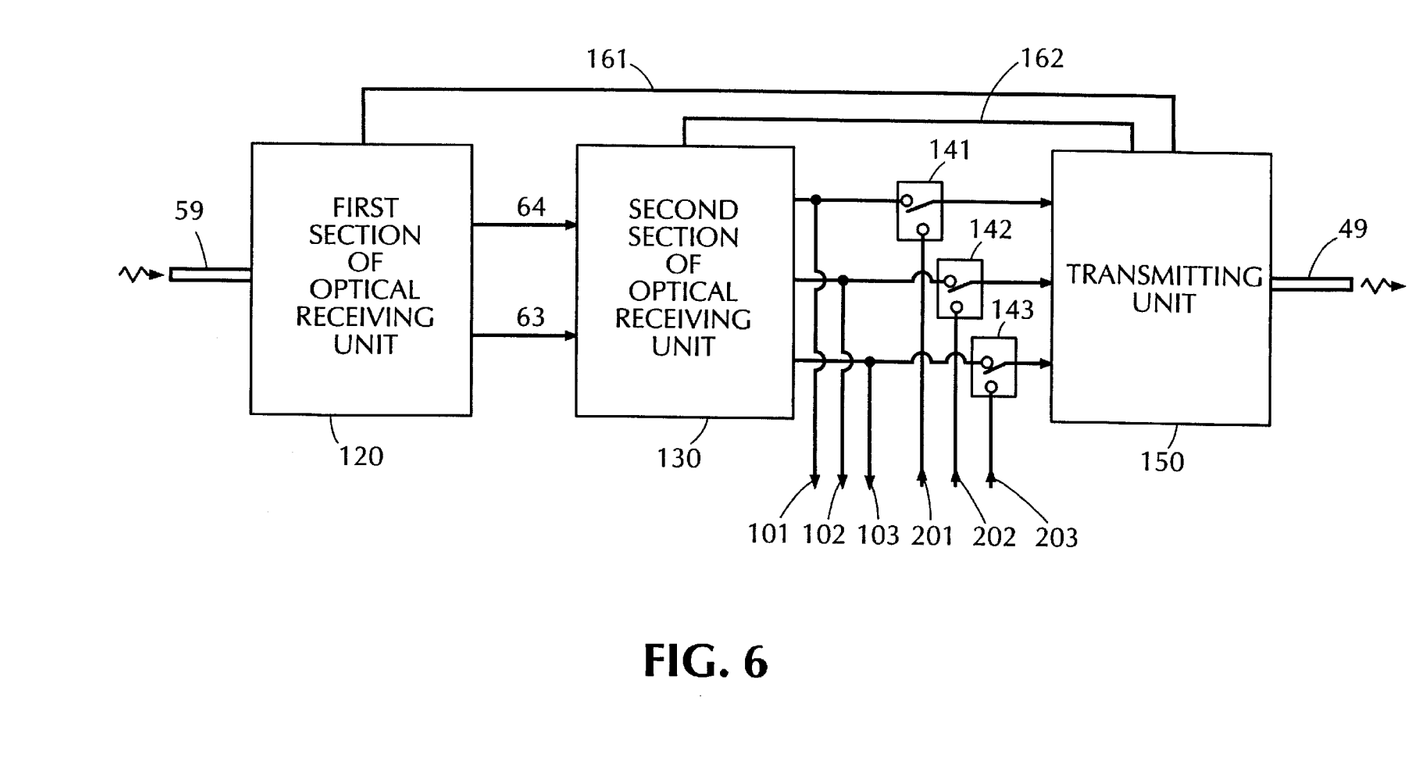
FIG. 6 is a diagram of a line terminal according to the invention.

A receiving unit and a transmitting unit of the type described can be disposed to form a line terminal adapted for use as receiving and transmitting station along an optical transmission line. Referring to FIG. 6 reproducing a diagram of this line terminal, the first and second sections of an optical receiving unit according to the present invention, made as described with reference to FIGS. 3 and 4, have been denoted by 120 and 130. The reconstructed tributary signals (101, 102, 103 in the case n=3 as provided in the figure) are sent both to the output ports and the change-over switches (141, 142, 143). Through the change-over switches the input signals to the transmitting unit 150 (made as described with reference to FIG. 1 and the timing signals of which 161, 162 are directly picked up from units 120, 130) can be selected from signals 101, 102, 103 coming from the receiving unit and a series of independent tributary signals 201, 202, 203. In this manner the "stepping-over" function controlled from the outside can be accomplished, according to the "Data Terminal Ready" modalites provided by standard ISO 2110, to which data interfaces refer: this means that the terminal can be controlled so as to operate as a repeater towards fibre 49 of the optical signals received from fibre 59, or as a receiver of the optical signals from fibre 59 and transmitter to fibre 49 of the locally-generated digital signals 201, 202, 203.

The described line terminal can be used for amplification and regeneration of optical signals along a high-attenuation optical communication line.

In particular, it can be employed for bidirectional transmission of service signals along an optical-fibre communication line, according to the general diagram shown in the above mentioned U.S. Pat. No. 5,113,459.

Figure 7:
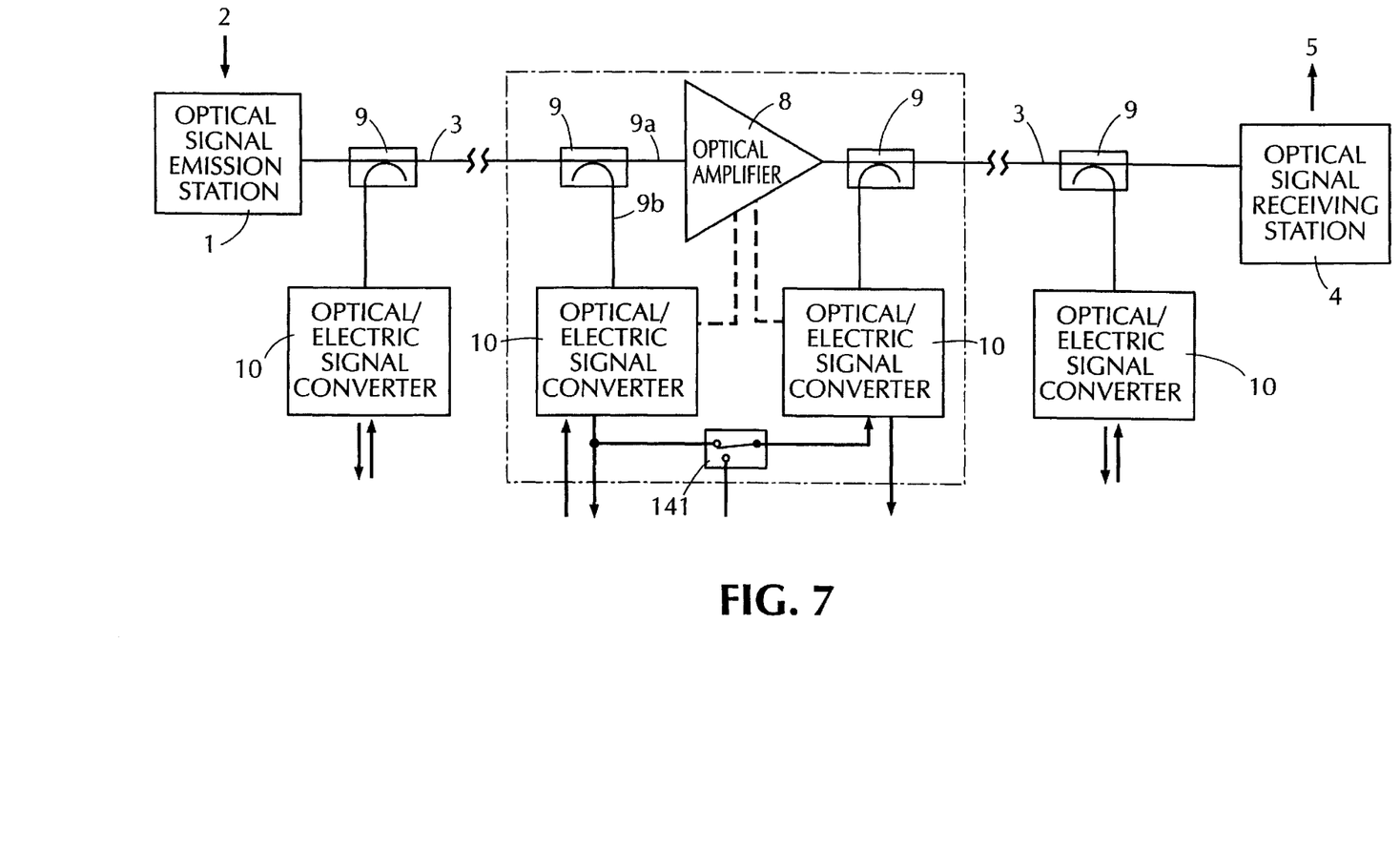
FIG. 7 is a diagram of an optical telecommunication system according to the present invention.

An optical telecommunication system according to the present invention is depicted in FIG. 7. In said system the bidirectional transmission of service signals is provided, over a channel of a wavelength different from that of the communication signals, along the same optical fibre-communication line 3 employed for transmission of the communication channels. As shown in the figure, a telecommunication line of the optical type generally comprises one station 1 for emitting optical signals in which the signals 2 to be transmitted are received usually in the form of electric signals and emitted in an optical form through an optical fibre 3 forming the line. At the opposite end of fibre 3, at a great distance (even some hundred kilometers) from the emission station 1, there is a receiving station 4 adapted to receive the optical signals transmitted along the fibre. to convert them to signals of another nature, electric signals for example, and send these signals 5 to the use apparatus, not shown.

As shown in FIG. 7, at each optical amplifier 8 of the active-fibre type with fluorescent dopant for example, two dichroic couplers 9 are present upstream and downstream of said amplifier, said couplers being adapted to receive at a common input port, the communication signals and service signals having different wavelengths and multiplexed on the same fibre, and to separate at the output on two outgoing fibres 9a and 9b, the communication signals at one wavelenth and the service signals at a different wavelength respectively, and also adapted to send to a single outgoing fibre, the communication signals and service signals separately inputted to fibres 9a, 9b.

Similar dichroic couplers are present at the emitting and receiving stations 1, 4.

Conveniently, the wavelength of the service signals is selected so as to be greatly different from the communication one; under this condition, the dichroic couplers ensure an optimal separation between the signals.

The communication wavelength is usually included between 1500 and 1600 nm, in a region named "third window", in order to operate at a minimum of the light attenuation within silica glass fibres, as diagrammatically shown in FIG. 6; this, as requested for telecommunications, enables data transmission at high speed, in the order of some hundred Mbit/s, over distances of some ten or hundred kilometers before the amplification, keeping the signals to sufficiently high levels for a correct final reception.

The service signals, on the contrary, due to their features, can be transmitted at low-speed, in the order of some hundred Kbit/s, in particular at a speed lower than 300 Kbit/s; According to the present invention these service signals are conveniently generated at a wavelength included in a range centered on 1300 nm, at a secondary minimum of the light attenuation curve in the silica glass, named "second window". The width of this range depends on the specific features of the line fibre used; A preferred range for line fibres of usual production can be of 1200 to 1400 nm.

Each dichroic coupler 9 is connected, together with the respective output fibre 9b carrying the service signals, to a respective connecting unit 10, through which the optical service signals from the coupler are received and converted to corresponding electric output signals, and electric input signals are converted to optical signals at the service wavelength and admitted to the fibre 9b entrance to be multiplexed along the line. This unit can be formed of a line terminal of the type described with reference to FIG. 6. The use of two line terminals 10 at each optical amplifier 8 enables a bidirectional service signal transmission along the optical communication line 3.

In this manner, an optical signal, at 1300 nm, extracted from the line 3 of the dichroic coupler 9 is converted to a corresponding electric signal which can be employed for the intended uses, such as for example service telephone communications by the maintenance staff or control of the optical amplifier 8, as shown in phantom lines in FIG. 7, or for other commands or controls; Likewise, electric control signals or service telephone communications can be thrown into the fibre 3 of the line to reach other destinations.

In order to enable the service signal to reach amplifiers or end stations located to a great distance from the signal-emitting site, along a fibre having several optical amplifiers, the electric signal coming out of a unit 10 connected to a dichroic coupler 9, located upstream of an optical line amplifier 8 can be sent, via a change-over switch 141, to the input port of a unit 10 connected to a second dichroic coupler 9 downstream of the optical amplifier, adapted to send the suitably amplified service signal along the subsequent optical fibre portion, until the arrival station or a new optical amplifier.

In this manner the service signal is amplified in a self-contained manner at each optical amplifier of the line and can therefore cover the whole requested distance reaching its destination at a sufficient level for the intended purposes.

Experiment

The Applicant has made and experimented a line terminal of the same type as described with reference to FIG. 6, in which the transmitting and receiving units have been made following the preceding descriptions, using the components and parameter values previously pointed out as the preferential ones and having the following values for the frequencies of the timing signals:

$f_1$=64 KHz
$f_2$=256 KHz
$f_3$=4096 KHz.

Figure 8:
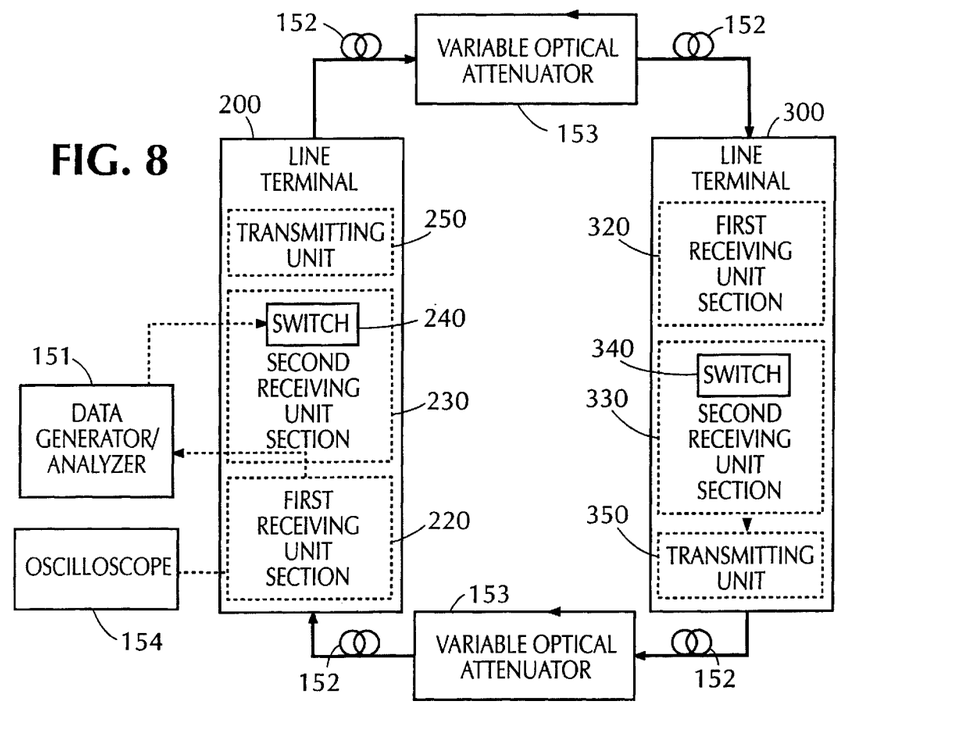
FIG. 8 is a diagram of the configuration adopted during an experiment.

For submitting the device to the experiment, an optical connection simulating the conditions along a high-attenuation optical-fibre line was utilized. This connection is shown in FIG. 8.

Two line terminals according to the invention have been denoted by 200 and 300 and they comprise respective transmitting units (250, 350), change-over switches (240, 340) and receiving units consisting of a first section (220, 320) and a second section (230, 330).

In order to generate the digital test signals at a frequency of 64 Kbit/s to be inputted to the transmitting unit 250, analyze the data from the receiver 220–230 and measure the BER, a data generator/analyzer 151, model MD6420A produced by ANRITSU Corp., 5-10-27 Minato-ku, Tokyo (JP) was used.

The optical signals at the wavelength of about 1300 nm produced by the transmitting unit 250 were sent along a single-mode optical fibre 152 to the receiving unit 320 of the line terminal 300. A variable optical attenuator 153, model MN939C. of the above mentioned ANRITSU was placed along the fibre 152. The terminal 300 was made up in the repeater mode connecting the input ports of the transmitting unit 350 to the output ports of unit 330. The optical signals generated by the transmitting unit 350 were sent to the receiving unit of the line terminal 200 by a single-mode optical fibre 152 and a variable attenuator 153, both like those already described.

To ensure symmetry of the transmission condition in the two ways, adjustment of the two variable attenuators was always carried out so as to give the same attenuation coefficient.

The analog signal present at the amplifier output of the receiving unit 220 was detected by an oscilloscope model TDS320 available from TEKTRONIX S.p.A., via Lampedusa 13, Milan (IT).

Figure 9:
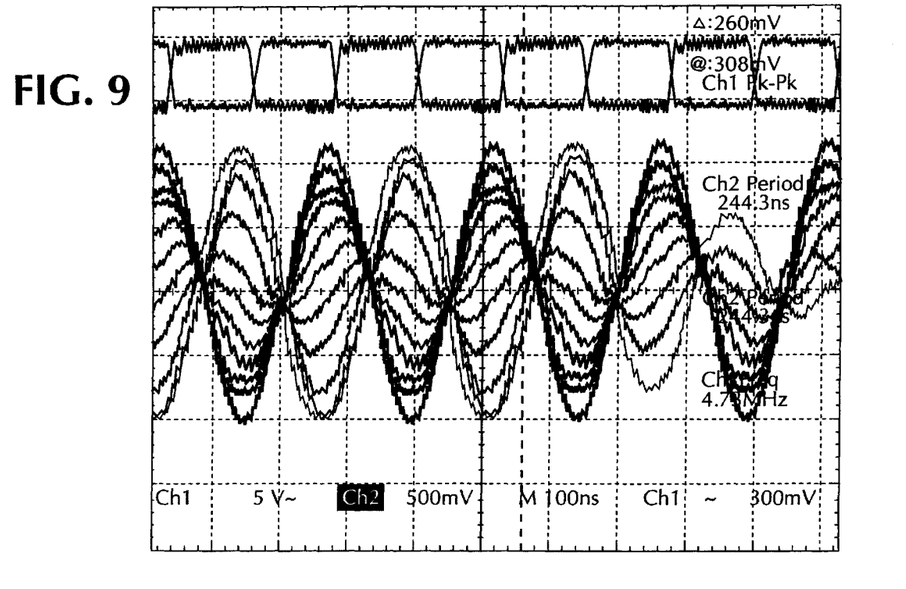
FIG. 9 is an oscillogram relating to the optical signal received during the experiment.
Figure 10A:
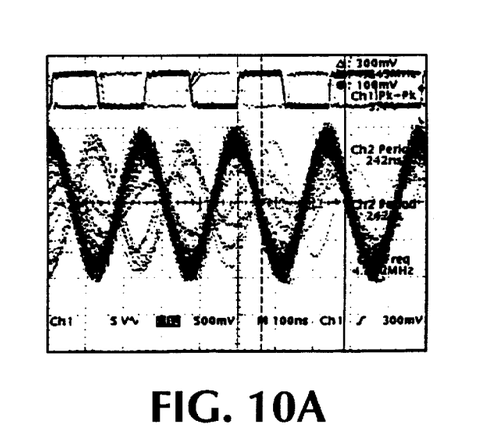
FIGS. 10A to 10F are oscillograms relating to the optical signal received during the experiment for different optical powers at the receiver.
Figure 10B:
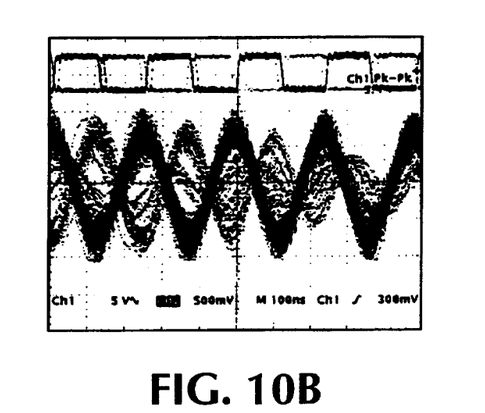
Figure 10C:
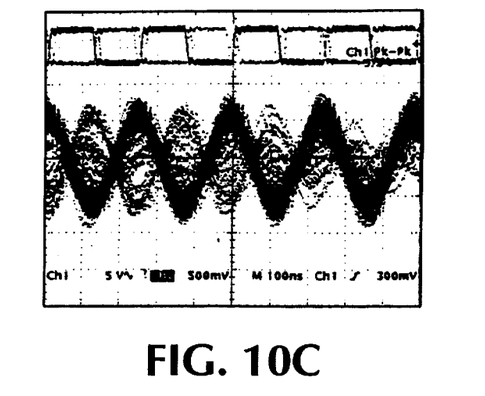
Figure 10D:
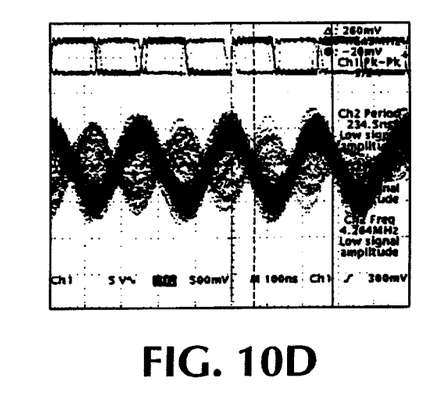
Figure 10E:
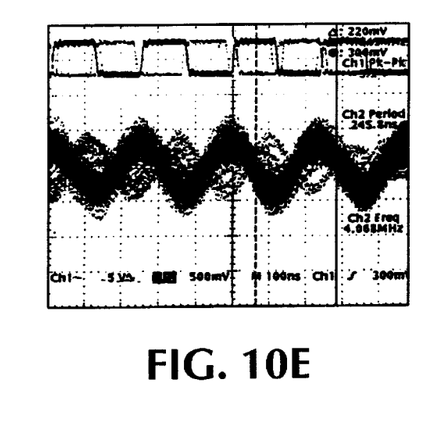
Figure 10F:
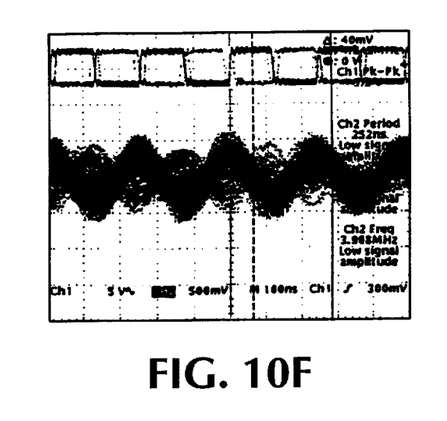

FIG. 9 shows an oscillogram in the case in which the variable optical attenuators 153 had been adjusted so that the received optical power was −50 dBm.

The an oscillogram of FIG. 9 is shown open, to denote an optimal transmission quality. In confirmation of that, no transmission errors were detected during the period of observation of 14 hours.

Then transmission tests were executed by varying adjustment of the variable attenuators so that the optical power would take values from −56 dBm to −61 dBm, with steps of −1 dame The eye diagrams detected at the receiver are reproduced in FIGS. 10a–10f.

It is possible to see that the oscillogram obtained is well open in the case of optical power at the receiver of −56 dBm and progressively closes on decreasing of the optical powers, until it becomes completely closed for an optical power of −61 dBm at the receiver.

Simultaneously, the BER value for each of the optical powers was measured.

Figure 11:
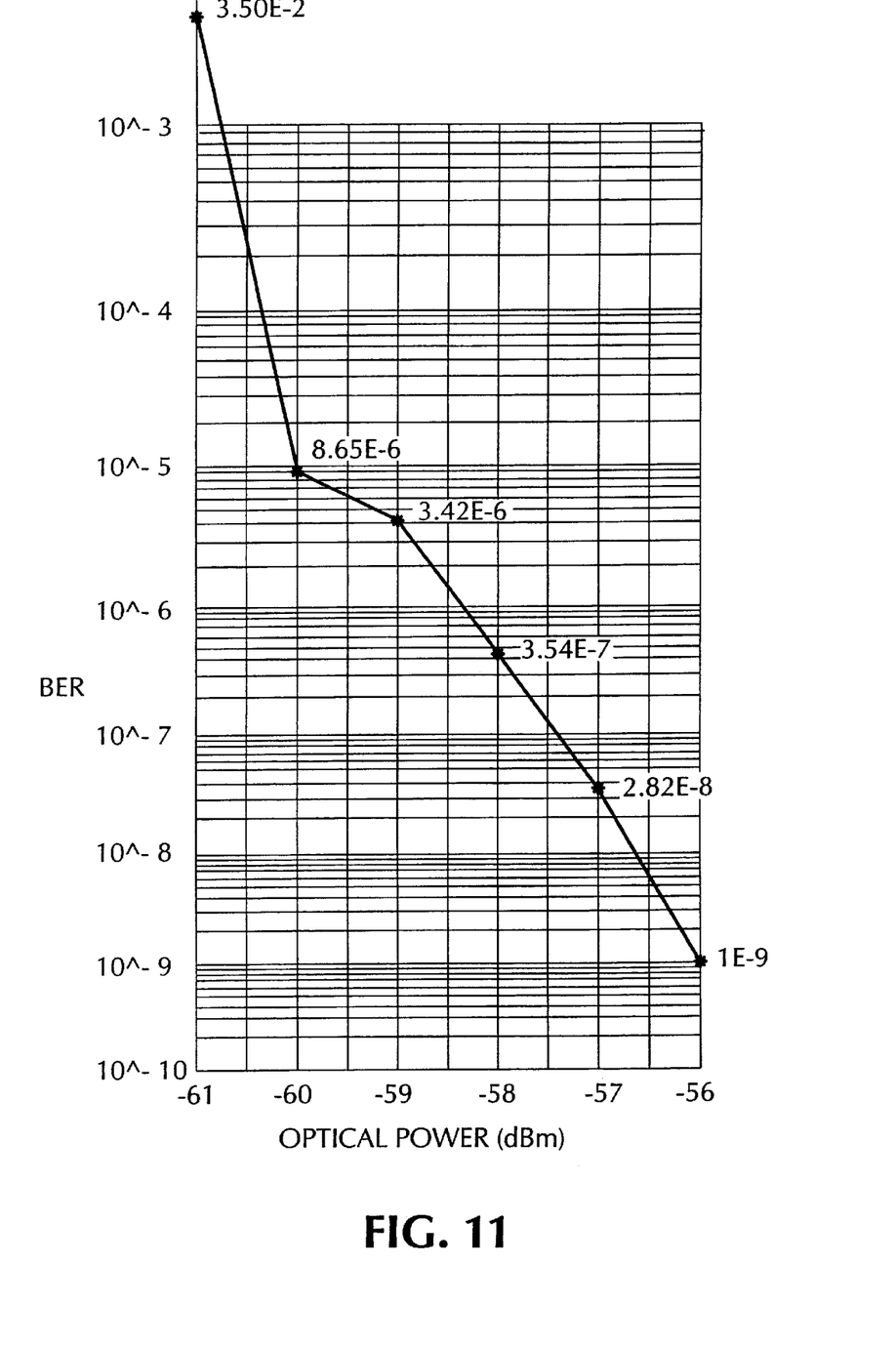
FIG. 11 is a diagram of the BER depending on the optical power at the receiver.

FIG. 11 reproduces the graph resulting from these measurements, with the BER value reproduced in a logarithmic scale on the y-axis, depending on the optical power at the receiver on the x-axis.

It is possible to see that the BER is lower than $10^{-5}$ for optical powers at the receiver greater than −60 dBm. The value of $10^{-5}$ is the typical BER value for telephone communication lines (see, the text "Telecommunication networks: protocols, modeling and analysis" by M. Schwartz, Addison-Wesley, 1987, in particular page 134, for example), and it is therefore a sufficient value for the transmission of service communications of the sound type, through a coding of the PCM type according to laws A or Mu(CCITT) for example, or for data transmission, through the digital coding protocol HDLC (High-level Data Link Control) for example. In addition, it is possible to see that a BER of $10^{-9}$ occurs for an optical power at the receiver of only −56 dBm, lower than the nominal sensitivity of the detector.

What is claimed is:

1. A digital optical telecommunication method comprising the steps of:

receiving a first electric digital signal at a first time rate from an input port;

coding said first electric digital signal using differential coding;

modulating an electric carrier by said coded electric digital signal to provide a second electric signal, wherein said electric carrier has a second time rate which is greater than said first time rate;

modulating the emission of a laser at a predetermined wavelength by said second electric signal to generate a modulated optical signal;

feeding said modulated optical signal to one end of an optical fiber line;

receiving said modulated optical signal at an output of said optical fiber line;

converting said received optical signal into a third electric signal;

generating a reconstructed digital signal at *aid first time rate from said third electric signal, wherein the generating further comprises:

sampling said third electric signal with a first timing signal;

performing differential demodulation on said sampled signal;

reconstructing a timing signal at said first time rate in timed relationship with said third electric signal; and generating the reconstructed digital signal at said first time rate from said demodulated signal and said reconstructed timing signal at said first time rate;

feeding said reconstructed digital signal to an output port.

2. A digital optical telecommunication method according to claim 1, wherein said second time rate is a multiple of said first time rate.

3. A digital optical telecommunication method according to claim 1, wherein said step of sampling comprises:

generating the first timing signal at a predetermined time rate and in timed relationship with said third electric signal, wherein said predetermined time rate is greater than said second time rate; and sampling said third electric signal with said first timing signal.

4. A digital optical telecommunication method according to claim 3, wherein said predetermined time rate is double said second time rate.

5. A digital optical telecommunication method according to claim 3, wherein the step of reconstructing a timing signal at said first time rate in timed relation with said third electric signal comprises the steps of:

dividing said first timing signal by an integer number;

determining a phase relation between said divided timing signal and said third electric signal; and determining said integer number based on said determined phase relation.

6. A digital optical telecommunication method according to claim 1, wherein the step of modulating an electric carrier at a second time rate comprises phase modulation.

7. A digital optical telecommunication method according to claim 1, wherein the step of generating a reconstructed digital signal at said first time rate further comprises the step of:

determining a logic value of said reconstructed digital signal which is present the greatest number of times within each period of said reconstructed timing signal at said first time rate.

8. A digital optical telecommunication method according to claim 7, wherein said step of determining the logic value of said digital signal present the greatest number of times within each period of said reconstructed timing signal at said first time rate comprises the steps of:

counting the number of times that said reconstructed timing signal finds the same logic value within said third electric signal for each period of said reconstructed timing signal at said first time rate;

comparing said number of times with a predetermined threshold; and determining a logic value corresponding to said comparison.

9. A digital optical telecommunication method according to claim 1, wherein the step of reconstructing a timing signal at said first time rate in timed relation with said third electric signal comprises the steps of:

generating the reconstructed timing signal at said first time rate with a random phase;

determining, within each period of said reconstructed timing signal at said first time rate, the leading edges of said third electric signal with said second time rate that are not simultaneous with the leading edge of the reconstructed timing signal;

counting the leading edges determined in the first and second halves of said period using opposite signs respectively;

summing the results of the above counting over several consecutive periods;

comparing said sum with at least one predetermined value; and adjusting the phase of said reconstructed timing signal to said first time rate on exceeding of said value.

10. A digital optical telecommunication method according to claim 1, wherein said step of converting said received optical signal into a third electric signal comprises detecting said received optical signal, converting the received optical signal into an electric signal, filtering said electric signal and amplifying said filtered signal.

11. A digital optical telecommunication method according to claim 1, wherein the step of receiving a first electric digital signal at a first time rate from an input port comprises receiving a predetermined number of tributary digital electric signals with a third time rate lower than said first time rate and multiplexing the tributary signals to form the first electric digital signal at said first time rate.

12. A digital optical telecommunication method according to claim 11 further comprising:

extracting timing signals at said third time rate from said third electric signal; and reconstructing a number of digital electric signals equal to the predetermined number of said tributary electric signals from said third digital electric signal and based on said timing signals at said third time rate.

13. A digital optical telecommunication method according to claim 1, wherein said predetermined wavelength is included between about 1200 nm and about 1400 nm.

14. A digital optical telecommunication method according to claim 1, wherein the generating step further comprises digitizing said third electric signal.

15. A digital optical telecommunication system comprising:

an optical transmitting station configured to receive a first electric signal at a first frequency and to generate a modulated optical signal corresponding to said first electric signal, wherein said modulated optical signal has a predetermined wavelength and said optical transmitting station comprises a modulator configured to modulate said first electric signal at a second frequency that is a multiple of said first frequency;

an optical receiving station configured to receive said modulated optical signal and to generate a second electric signal at said first frequency, wherein the optical receiving station comprises, an opto-electric converter configured to convert said modulated optical signal into said second electric signal, a phase-locked loop circuit configured to generate a timing signal at a predetermined frequency and in timed relation with said second electric signal, a sampler configured to sample said second electric signal with said timing signal, a differential demodulator configured to demodulate said sampled signal, a circuit for reconstructing a timing signal at said first frequency in timed relation with said second electric signal, a decision circuit configured to generate a reconstructed digital signal at said first frequency from said demodulated signal and said reconstructed timing signal at said first frequency, and an output for said reconstructed digital signal; and an optical fiber line for transmission of said modulated optical signal between said optical transmitting station and said optical receiving station.

16. A digital optical telecommunication system according to claim 15, wherein said predetermined wavelength is included between about 1200 nm and about 1400 nm.

17. A digital optical telecommunication system according to claim 15, wherein said predetermined frequency is greater than said second frequency.

18. A digital optical telecommunication system according to claim 15, wherein said predetermined frequency is double said second frequency.

19. A digital optical telecommunication system according to claim 15, wherein said optical fiber line comprises:

at least one optical amplifier, means for admitting optical service signals to and extracting optical service signals from the optical fiber line, wherein the admitting and extracting means comprises at least one emitting and receiving unit for optical service signals adapted to emit to and receive from the optical line service signals, wherein the service signals comprise communication or control signals electrically supplied to and extracted from the emitting and receiving unit in the form of optical signals having a service wavelength substantially different from the wavelength of telecommunication signals, wherein the emitting and receiving unit is associated with a related optical coupler connected along the line and adapted to couple and extract the optical service signals on the line fiber and comprises:

an optical emitting station adapted to receive said communication or control signals, generate a second modulated optical signal including said communication or control signals and having said service wavelength and send said second modulated optical signal to an associated optical coupler; and an optical receiving station adapted to receive an optical signal at said service wavelength from an associated optical coupler and generate electric communication or control signals, wherein the optical receiving station comprises means for converting said received optical signal to an electric form; and at least one means for admitting and extracting optical service signals which is associated with the at least one optical amplifier.

20. A digital optical telecommunication method comprising the following steps:

receiving a first electric signal at a first frequency;

generating a modulated optical signal corresponding to said first electric signal, said modulated optical signal having a predetermined wavelength, the generating step comprising modulating said first electric signal at a second frequency that is a multiple of said first frequency, wherein said predetermined wavelength is included between about 1200 nm and about 1400 nm;

transmitting said modulated optical signal on an optical line;

receiving said modulated optical signal from said optical line; and converting said modulated optical signal into a second electric signal at said first frequency.

21. A digital optical telecommunication system comprising:

means for receiving a first electric digital signal at a first time rate from an input port;

means for coding said first electric digital signal using differential coding;

means for modulating an electric carrier by said coded electric digital signal to provide a second electric signal, wherein said electric carrier has a second time rate which is greater than said first time rate;

means for modulating the emission of a laser at a predetermined wavelength by said second electric signal to generate a modulated optical signal;

means for feeding said modulated optical signal to one end of an optical fiber line;

means for receiving said modulated optical signal at an output of said optical fiber line;

means for converting said received optical signal into a third electric signal;

means for generating a reconstructed digital signal at said first time rate from said third electric signal, wherein the generating means further comprises:

means for sampling said third electric signal with a first timing signal;

means for performing differential demodulation on said sampled signal;

means for reconstructing a timing signal at said first time rate in timed relationship with said third electric signal; and means for generating the reconstructed digital signal at said first time rate from said demodulated signal and said reconstructed timing signal at said first time rate; and means for feeding said reconstructed digital signal to an output port.

\* \* \* \* \*